K. MALCHER.
TRUCK.
APPLICATION FILED JUNE 20, 1914. RENEWED DEC. 7, 1916.

1,232,822.

Patented July 10, 1917.
2 SHEETS—SHEET 1.

Witnesses:
H. E. Thompson
C. Mulreany

Inventor
Konrad Malcher,
By his Attorneys
Edgar Tate & Co.

K. MALCHER.
TRUCK.
APPLICATION FILED JUNE 20, 1914. RENEWED DEC. 7, 1916.

1,232,822.

Patented July 10, 1917.
2 SHEETS—SHEET 2.

Witnesses:
H. E. Thompson
C. Mulreany

Inventor
Konrad Malcher.
By his Attorneys

UNITED STATES PATENT OFFICE.

KONRAD MALCHER, OF GLEIWITZ, GERMANY.

TRUCK.

1,232,822.  Specification of Letters Patent.  Patented July 10, 1917.

Application filed June 20, 1914, Serial No. 846,241. Renewed December 7, 1916. Serial No. 135,703.

*To all whom it may concern:*

Be it known that I, KONRAD MALCHER, a citizen of the German Empire, and residing at Gleiwitz, Upper Silesia, German Empire, have invented certain new and useful Improvements in Trucks, of which the following is a full, clear, and exact description.

Trucks are known in which the bottoms of the same are divided longitudinally into three parts, the central part being fixed, while the two wings may be turned inwardly and contact with their outer edges to form a conical bottom with lateral openings, through and over which the contents of the trucks slide out automatically. The trucks of this class hitherto known, have the disadvantage that the longitudinal girders of the underframing are too far from the bottom of the truck, or that they have to be adjusted or displaced toward the center of the truck in order to form a sufficiently large opening and a sufficiently steep ridge to enable the material in the truck to discharge properly. The framework of trucks of this class is too high and the buffer shocks are not imparted directly to the longitudinals.

The object of the present invention is to avoid these disadvantages by employing longitudinals fixed directly to the fixed central section of the truck-bottom and having a Z-shaped cross section the webs of which extend slantingly outward and downward beyond the truck wheels. This enables the formation of a sufficiently large discharge opening and the girders themselves form part of the sliding surface for the goods, without having to raise the bottom of the truck higher above the metals than is the case in the ordinary class of truck. Slantingly directed plates may form a continuation of the slanting webs of the girders to insure the discharge of the material beyond the metals. The frame is greatly simplified and rendered very strong.

By means of the present invention a convertible truck is formed, which may have a flat bottom for ordinary purposes or a centrally raised bottom to enable the self-discharge.

Figure 1:
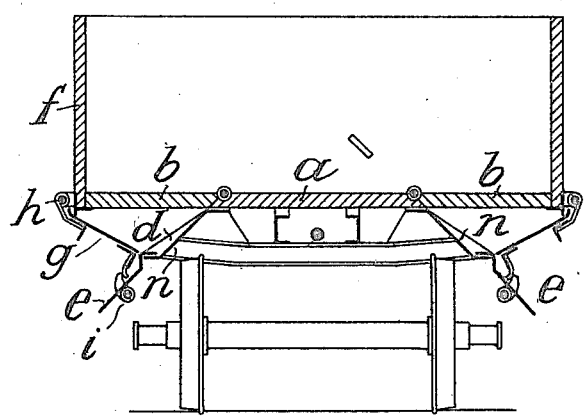

In the accompanying drawing Figure 1 represents a cross section of a truck with the bottom closed.

Figure 2:
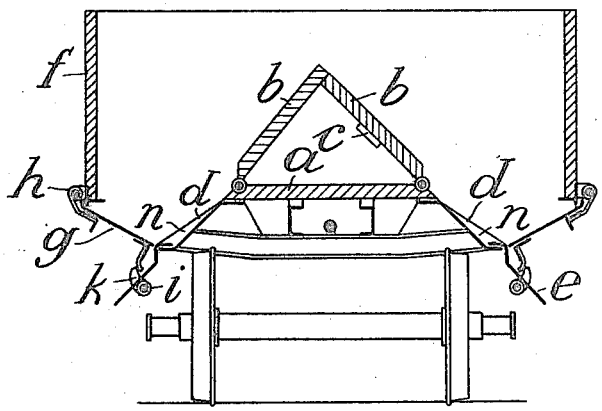
Figure 3:
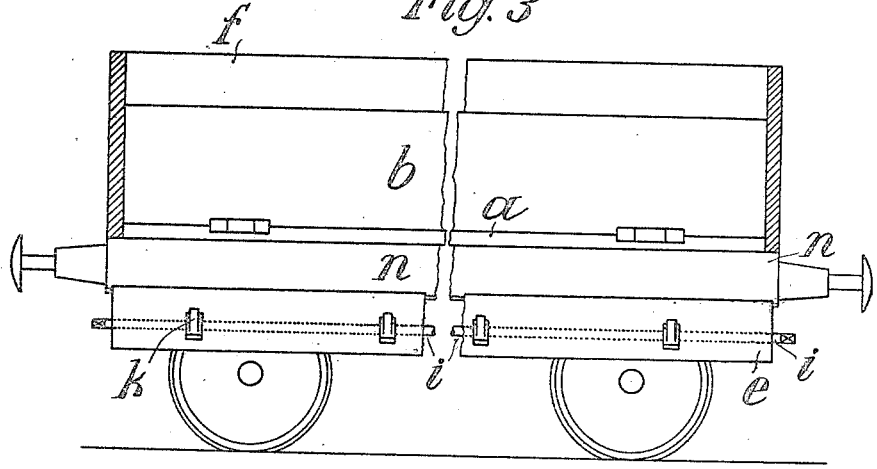
Figure 4:
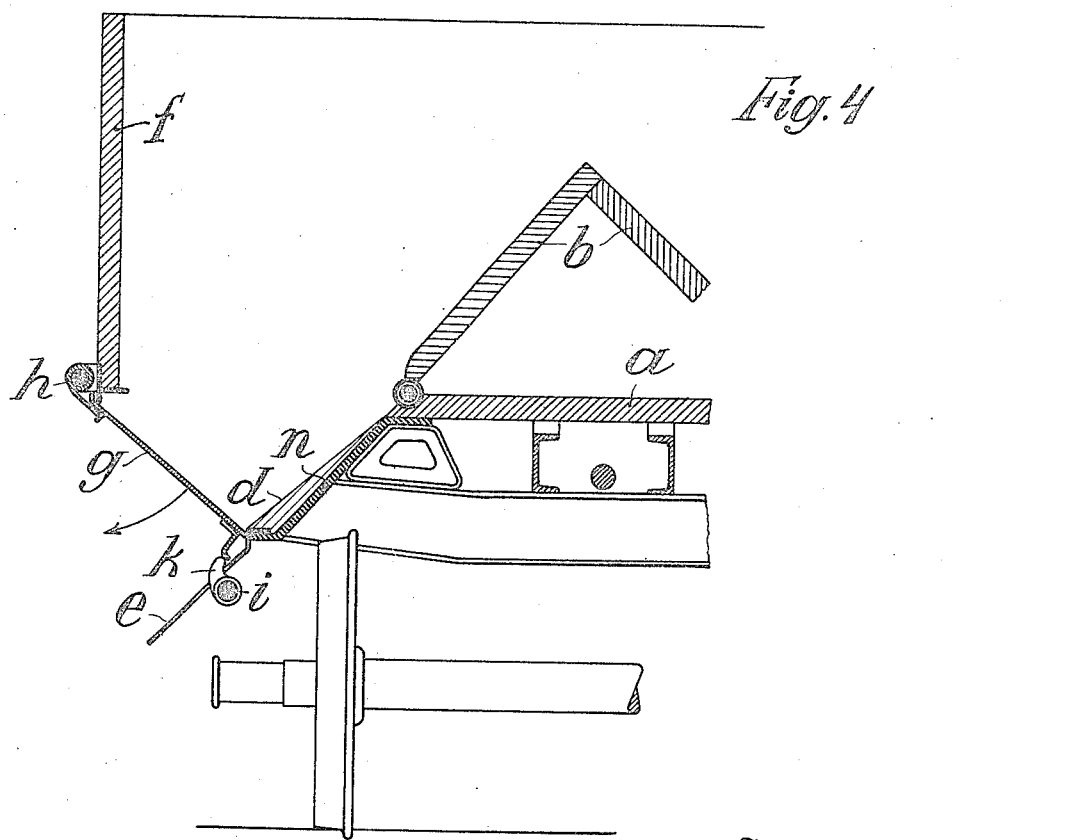

Fig. 2 a similar part cross section with open bottom;

Fig. 3 a side view of the truck with the upper part in section; and,

Fig. 4 a part cross section on an enlarged scale with open bottom.

The two wings $b$—$b$ are hinged to the fixed bottom part $a$ in the known manner and are held in the upwardly turned position (Fig. 2) by means of any suitable lugs or supports $c$, on the end walls of the truck.

The novelty of the present invention consists in the provision of slantingly shaped longitudinals $n$ of Z-shaped cross-section, the webs of which extend slantingly outward and downward. The girders also serve to receive the slanting filling $d$ forming the sliding surface for the material extending beyond the wheels. They enable sufficiently, large discharge openings to be formed, with a normal size of truck, and also a sufficient slant of the folded wings to effect a proper discharge of the material. These surfaces may be prolonged by means of lateral slantingly disposed plates $e$.

The discharge openings are advantageously closed by means of flaps $g$ hinged to the slides $f$ of the truck at $h$ and held closed by means of claws $k$ mounted on a shaft $i$, but any other form of closure might be employed. When empty or in use for other purposes the bottom of the truck is rendered flat by the flaps $b$ being turned down (Fig. 1).

Having fully described my invention, what I claim as new and desire to secure by Letters Patent, is:—

1. A convertible truck having a fixed and movable bottom portion, and longitudinal Z-shaped girders secured to the fixed bottom portion and extending downwardly and outwardly and with the lower edge portions of which are connected extension plates serving as means for prolonging the discharge of the material of the truck.

2. In a convertible truck having a fixed and movable bottom portion, and longitudinal Z-shaped girders secured to the fixed bottom portion and extending downwardly and outwardly and with the lower edge portions of which are connected extension plates serving as means for prolonging the discharge of the material of the truck, said girders also serving to receive fillings on their inner surfaces.

3. In a convertible truck, the bottom of which consists of a fixed central section running throughout the length of the truck and two longitudinally disposed movable flap portions hinged to the opposite sides of the said central section and adapted to be turned back and rest one against the other, and longitudinal girders Z-shaped in cross section, connected with said fixed central section and extending downwardly and outwardly, said girders being provided with plates for prolonging the discharge of the material of the truck.

In testimony whereof I affix my signature.

KONRAD MALCHER.

Copies of this patent may be obtained for five cents each, by addressing the "Commissioner of Patents, Washington, D. C."